Figure 1:
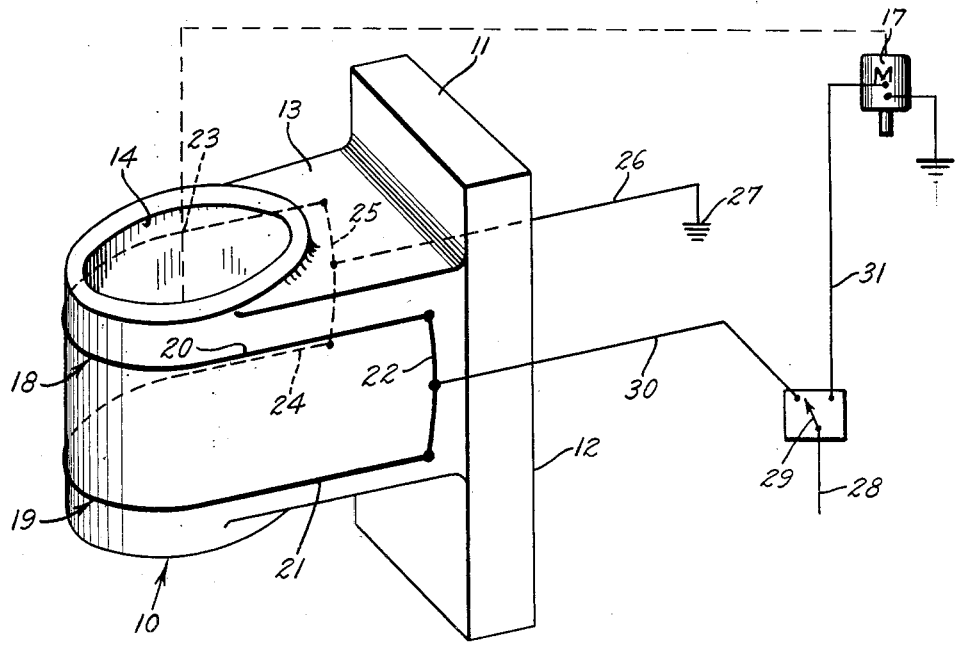

July 11, 1950

F. C. VICTORY 2,515,146

MEANS FOR MAINTAINING DIMENSIONAL
STABILITY IN MACHINE PARTS
Filed July 31, 1948

INVENTOR.
FREDERICK C. VICTORY
BY
John Hanrahan
ATTORNEY

Patented July 11, 1950

2,515,146

UNITED STATES PATENT OFFICE 2,515,146

MEANS FOR MAINTAINING DIMENSIONAL STABILITY IN MACHINE PARTS

Frederick C. Victory, Milford, Conn., assignor to Moore Special Tool Co., Inc., a corporation of Connecticut Application July 31, 1948, Serial No. 41,874

2 Claims. (Cl. 171—97)

This invention relates to new and useful improvements in machines and has particular relation to a machine including means for maintaining dimensional stability in an operating part.

An object of the invention is to provide in a machine, means for controlling thermal expansion therein by maintaining a member in which heat is generated during operation of the machine constantly at the same temperature as is normally attained during the operating cycle, such means comprising a unit including an electric heater or electric heaters and a circuit interlocking the unit with the control of the machine whereby such unit is cut in when the machine is shut off and is cut out when the machine is cut in or started.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 2:
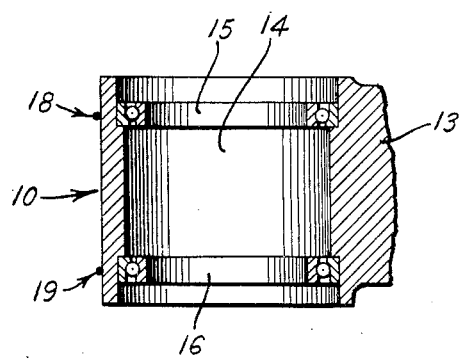

In the drawing:

Fig. 1 is an isometric view showing a spindle supporting member or quill housing of a machine having a heater applied thereto and also showing the machine's motor and the circuit with switch means whereby as the circuit to the machine's motor is opened the circuit is closed through the heater and vice versa; and Fig. 2 is a detail vertical sectional view through the spindle supporting member.

Referring in detail to the drawing, at 10 is generally indicated a spindle supporting member or quill housing including a mounting block 11 having a rear face 12 to be bolted or otherwise secured to or against a support. A projection or extension 13 from the front face of the block or pad 11 has an opening 14 therethrough for the suitable mounting of a spindle or of a spindle and quill, as is customary in the art. At suitably spaced points along the opening 14, the projection 13 mounts upper and lower bearing means 15 and 16 here shown as anti-friction ball bearing means.

The machine of which the spindle supporting means 10 comprises a part also includes an electric driving or operating motor 17 which through means (not shown) drives the spindle (not shown) mounted by the means 10. The described structure is of a general nature common in machines or machine tools. For precision work, difficulty is experienced due to dimensional instability as between the face 12 of the supporting means and the center line of the opening 14. This dimensional instability results from thermal expansion in the supporting means 10 as the same heats up during a normal cycle of the machine's operation.

According to the present invention, an electric heating means or unit of a fixed B. t. u. value is suitably associated with or mounted on the supporting means 10 and is energized when the motor 17 is shut off and the machine shut down and is de-energized or shut off when the circuit to the motor is energized and the machine started. This unit is of a calculated B. t. u. value whereby to put into the machine and more specifically into the supporting means 10 sufficient heat whereby (during shut down time of the machine) to maintain said supporting means or quill housing at substantially the temperature developed in the latter during a normal cycle of operation of the machine. Thus, if during such normal cycle of operation, tests show that the supporting means 10 rises to a temperature of approximately ten degrees above room temperature, then the added unit would be of a value to raise such supporting means to that temperature during the shut down time of the machine.

In the drawing, the heating unit is shown as comprising upper and lower elements in the form of wires 18 and 19. These wires are of calculated resistances whereby to produce the desired heat and are shown as laid about the outer surface of the projection or extension 13 substantially in line with the upper and lower bearings 15 and 16, respectively. The mounting of these heaters is not specifically herein set forth, although it will be understood that they will be covered by electrical insulating material where desired.

The elements 18 and 19 are connected in parallel. Thus, viewing Fig. 1, the near arms 20 and 21 of the elements are connected by a wire 22 while the arms 23 and 24 of the elements, which arms are at the far side of the projection or extension 13, are connected as by a wire 25. A lead 26 from the wire 25 connects to a common ground 27 or is grounded as at 27. The input line to the machine is shown at 28 and through a two position switch lever 29 may be selectively connected with a lead 30 to the wire 22 or with a lead 31 to the motor 17.

Generally, this switch is of a type designed to be operated by merely pressing it with the foot and such operation carries it from one position to the other. That is, in one position the switch 29 connects the supply line 28 with the wire 30 whereby the elements 18 and 19 are energized and supply heat as above described. In this position of the switch, the motor 17 is shut off or de-energized. In the other position of the switch, the supply line 28 is connected with the lead 31 to the motor whereby the machine is in operation. At this time, the supply line is disconnected from the lead or wire 30 whereby the elements 18 and 19 are de-energized.

Thus, it will be seen that the heating elements 18 and 19 comprising the unit for putting auxiliary heat into the supporting means 10 are interlocked with the electric power motor 17 for driving the machine, or are at least interlocked through the switch 29. Therefore, I have provided an arrangement whereby the heating unit comprising the elements 18 and 19 is cut in when the machine is cut off (the motor 17 de-energized) and is cut out or shut off when the motor is energized to set the machine into operation. It is recognized that with this arrangement that after a day's run when the machine is cut off the temperature in the supporting means will be raised above its normal operating temperature as the heating unit is energized while the machine is yet at operating temperature.

However, this means 10 is preferably of an "Invar" metal having a very low thermal co-efficient of expansion and since the machine is not at the described time being used, the slightly excessive heat will make little, if any, difference. In actual practise, the unit comprising the elements 18 and 19 is of a fifty watt capacity in one particular installation.

With the described arrangement, it will be seen that when a machine is left idle over night or over a weekend or holiday or the like, the means 10 will not cool off whereby contraction in such means will result in a reduction of the distance between the face 12 and the center line of opening 14 while the machine is shut down. Should such a contraction occur, then when the machine is started into operation the mentioned distance will have one measurement and after the machine has been operated to attain its normal operating temperature there will be a different dimension and inaccuracies in the work will occur at one time or the other and/or during the building up of the temperature of the part 10 to the normal operating temperature.

With the present arrangement, the mentioned difficulties will not be experienced since after an overnight shut down or weekend shut down or the like, the spindle supporting means 10 or the quill housing 10 will be at the temperature developed during the normal operation of the machine and it will remain at such temperature since when the machine is put into operation and the power to the unit comprising the elements 18 and 19 is shut off, as the machine operates it will develop heat in the part 10. Thus, there will occur no inaccuracies in the work during the warming up period of the machine as it will have no warming up period. Alternatively, there will be no delay in waiting for the machine to warm up since at starting time in the morning or after a holiday or weekend the machine is at the proper temperature to immediately start precision work.

Having thus set forth the nature of my invention, what I claim is:

1. In a machine including an electric driving motor and a spindle supporting member having a spindle receiving opening therethrough for a spindle to be driven from said motor, said member within said opening mounting spaced bearings, an electric heater on said member and of a fixed B. t. u. heat value whereby on being energized to impart to said member substantially the same amount of heat as that normally attained during the operating cycle of the machine, said heater comprising spaced elements substantially aligned with said bearings, a circuit including said motor and a circuit having said spaced heater elements connected in parallel therein, and a two position switch controlling each of said circuits and arranged to open the motor circuit and close the heater circuit in one position and in the other of its positions open the heater circuit and close the motor circuit whereby when the motor is in operation the heater elements are de-energized and vice versa.

2. In a machine including an electric driving motor and a spindle supporting member having a spindle receiving opening therethrough for a spindle to be driven from said motor, said member within said opening mounting spaced bearings, an electric heater on said member and of a fixed B. t. u. heat value whereby on being energized to impart to said member substantially the same amount of heat as that normally attained during the operating cycle of the machine, said heater comprising spaced elements substantially aligned with said bearings, a circuit including said motor and a circuit including said heater, and a two position switch controlling each of said circuits and arranged to open the motor circuit and close the heater circuit in one position and in the other of its positions open the heater circuit and close the motor circuit whereby when the motor is in operation the heater is de-energized and vice versa.

FREDERICK C. VICTORY.

REFERENCES CITED

The following references are of record in the file of this patent:

UNITED STATES PATENTS

| Number | Name | Date |
| --- | --- | --- |
| 1,582,853 | Newmeyer | Apr. 27, 1926 |
| 2,027,576 | Chandler | Jan. 14, 1936 |
| 2,312,291 | Tyson | Feb. 23, 1943 |
| 2,352,206 | Kendall | June 27, 1944 |